(12) United States Patent
Dieckmann

(10) Patent No.: US 6,803,029 B2
(45) Date of Patent: Oct. 12, 2004

(54) PROCESS FOR REDUCING METAL CATALYZED COKE FORMATION IN HYDROCARBON PROCESSING

(75) Inventor: Gunther H. Dieckmann, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/371,529

(22) Filed: Feb. 21, 2003

(65) Prior Publication Data

US 2003/0161785 A1 Aug. 28, 2003

Related U.S. Application Data

(60) Provisional application No. 60/358,789, filed on Feb. 22, 2002.

(51) Int. Cl.[7] ................................................. C01B 3/26
(52) U.S. Cl. ...................................... 423/652; 252/373
(58) Field of Search .................. 252/373; 423/652–654

(56) References Cited

U.S. PATENT DOCUMENTS

| | | | |
|---|---|---|---|
| 1,988,217 A | | 1/1935 | Sayles ........................... 148/31 |
| 3,254,969 A | | 6/1966 | Krefeld et al. ............. 29/183.5 |
| 3,486,927 A | | 12/1969 | Gauje ....................... 117/107.2 |
| 3,645,701 A | * | 2/1972 | Banchik et al. ............. 422/197 |
| 3,827,967 A | | 8/1974 | Nap et al. ...................... 208/48 |
| 4,365,006 A | | 12/1982 | Baker ........................... 429/17 |
| 4,830,834 A | | 5/1989 | Stahl et al. .................. 422/190 |
| 5,149,464 A | | 9/1992 | Green et al. ................. 252/373 |
| 5,242,574 A | * | 9/1993 | Broutin et al. ............. 208/48 R |
| 5,346,779 A | | 9/1994 | Nakazawa ................... 429/19 |
| 5,413,700 A | | 5/1995 | Heyse et al. ................ 208/134 |
| 5,486,313 A | | 1/1996 | De Jong et al. ............. 252/373 |
| 5,527,632 A | | 6/1996 | Gardner ........................ 429/27 |
| 5,593,571 A | | 1/1997 | Heyse et al. ................. 208/134 |
| 5,676,821 A | | 10/1997 | Heyse et al. ................. 208/135 |
| 5,849,969 A | | 12/1998 | Heyse et al. ................. 585/483 |
| 5,863,418 A | | 1/1999 | Heyse et al. ................. 208/135 |
| 5,866,743 A | | 2/1999 | Heyse et al. ................. 585/496 |
| 5,932,141 A | | 8/1999 | Rostrop-Nielson et al. . 252/373 |
| 6,019,943 A | | 2/2000 | Buscemi et al. ............... 422/8 |
| 6,083,425 A | | 7/2000 | Clawson et al. ............ 242/372 |
| 6,085,512 A | | 7/2000 | Agee et al. ................. 60/39.02 |
| 6,123,913 A | | 9/2000 | Clawson et al. ............ 423/652 |

FOREIGN PATENT DOCUMENTS

| | | |
|---|---|---|
| EP | 0609079 B1 | 1/1994 |
| WO | WO99/48805 | 3/1998 |
| WO | WO99/29249 | 11/1998 |

OTHER PUBLICATIONS

G. William Goward, Consultant: Leslie L. Seigle, State U of NY at Stony Brook, "Diffusion Coatings for Gas Turbine Engine Hot Section Parts", pp. 611–613.

* cited by examiner

*Primary Examiner*—Stanley S. Silverman
*Assistant Examiner*—Maribel Medina
(74) *Attorney, Agent, or Firm*—D. M. Tuck

(57) ABSTRACT

The present invention provides a process for suppressing the formation of metal-containing coke during processing of a hydrocarbonaceous material, such as for example a hydrocarbon conversion processes. The process involves using a feed comprising $CO_2$ and steam in combination with equipment comprising high nickel and/or cobalt alloy metallurgy including aluminum or an aluminum coating in order to reduce metal catalyzed coking at process temperatures above about 800 degrees F. The process is particularly useful in the reforming of a hydrocarbon material to make hydrogen for operation in a fuel cell.

20 Claims, No Drawings

PROCESS FOR REDUCING METAL CATALYZED COKE FORMATION IN HYDROCARBON PROCESSING

This application claims the benefit of Provisional Application No. 60/358,789, filed Feb. 22, 2002.

FIELD OF THE INVENTION

The present invention relates to a process for reducing coke formation in organic compound conversion processes.

BACKGROUND OF THE INVENTION

Fouling of catalysts and/or process equipment by coke is a major problem in high temperature organic compound conversion processes. Coke can cover active catalyst sites and plug catalyst pores, thereby reducing activity. In process equipment, it can build up on furnace tubes and reactors leading to heat transfer and pressure drop problems. Coking in some cases can be so severe as to completely plug the process with coke. While there are many methods of controlling coking such as careful selection of catalysts and plant metallurgy, application of low coking coatings, and/or the addition of steam or sulfur, coking still remains a major problem. Application of low coking coatings, often referred to as Metal Protection Technology (MPT) is taught in U.S. Pat. Nos. 5,866,743; 5,849,969; 6,019,943; 5,676,821; 5,593,571; 5,863,418; and 5,413,700 all of which are incorporated herein by reference. In some processes such as delayed coking or flexi-coking, coke is a by-product of the process that has a very low value. A particular type of coking that is a problem in hydrocarbon processing is Metal Catalyzed Coking. Metal catalyzed coking occurs when hydrocarbons and/or carbon monoxide present in certain processes react with the plant or process metallurgy at temperatures typically above 800° F. to produce carbon-containing deposits. These carbon containing deposits can build up to a level where they are detrimental to the process by creating, for example, pressure drop problems, blocking off catalytic sites, and/or impeding the transfer of heat, in for example, a furnace tube. Metal catalyzed coking is also an indication that the plant or process metallurgy is undergoing metal dusting and possibly carburization. Both of these later processes can affect the structural integrity of the metallurgy. Typically, iron, cobalt and/or nickel containing alloys show metal catalyzed coking at temperatures of 800° F. or higher. Of particular interest to this invention are high temperature processes such as steam reforming, partial oxidative reforming, and/or autothermal reforming associated with the conversion of hydrocarbons to carbon monoxide and hydrogen for use in Fischer-Tropisch plants, syngas to methanol plants, fuel cells or any other process that require or consume hydrogen and/or carbon monoxide. There are many methods taught in the art to control metal catalyzed coking. Some techniques such as addition of sulfur to the process stream cannot be used in certain processes such as steam or autothermal reforming processes due to sulfur poisoning of the reformer catalyst. Thus the addition of steam is normally used to control coking. Typically, the steam to carbon mole ratio used in reforming processes range from about 0.5 to 6 and more commonly from about 2 to 4. However addition of steam is frequently not sufficient to control metal catalyzed coking. In one form of the art, iron, cobalt and/or nickel containing alloys are treated with aluminum at high temperature to form aluminum diffusion coating. Methods for preparing such coatings are taught in the "Metals Handbook", $9^{th}$ Ed, Vol 5 page 611–613 and for example in U.S. Pat. Nos. 1,988,217, 3,486,927 and 3,254,969 all of which are incorporated herein by reference. U.S. Pat. No. 1,988,217, to Sayles, which is incorporated herein by reference, teaches that aluminum diffusion coatings with a surface concentration of about 5 to 35% Al can be used to protect oil furnace tubes and other high temperature processes from the corrosive action of oil. U.S. Pat. No. 3,827,967 to Nap et. al. which is incorporated herein by reference, teaches that an aluminum coated alloy will resist coking in the thermal cracking of hydrocarbon feedstocks. The beneficial effects of aluminum diffusion coatings on specifically suppressing metal catalyzed coking under low sulfur conditions is claimed in U.S. Pat. No. 5,849,969 to Heyse et. al. Alternatively, aluminum-containing alloys have been shown to be resistant to coking. U.S. Pat. No. 4,532,109 to Maeda teaches that alloys containing 1–10% Al that have been oxidized prior to high temperature contact with hydrocarbons, or carbon monoxide show reduced metal catalyzed coking rates. U.S. Pat. Nos. 4,532,109, and 5,849,969 are incorporated herein by reference in their entirety. Unfortunately, metal catalyzed coking can still occur on Al containing alloys or Al rich surfaces under conditions commonly encountered in high temperature processes. Clearly any method that can reduce the amount of metal catalyzed coke formed would be very beneficial. The present invention provides such a method that can be used to minimize coking in a wide variety of processes and applications.

SUMMARY OF THE INVENTION

The present invention provides a process for reducing metal catalyzed coke formation in organic compound conversion processes. The present invention dramatically reduces or eliminates metal catalyzed coking on aluminum coated or aluminum containing nickel and/or cobalt containing alloys by the presence of carbon dioxide and steam in the process stream.

One embodiment of the present invention describes a process for steam reforming of hydrocarbons to produce hydrogen and carbon monoxide, comprising: passing a feed comprising hydrocarbons, steam, and $CO_2$ over a steam reforming catalyst, at steam reforming conditions comprising a temperature of at least 800 degrees F., in a steam reformer to form an effluent comprising CO and hydrogen, wherein said steam reformer is constructed at least in part of a material comprising of a cobalt or nickel containing alloy further comprising aluminum or an aluminum coating, cladding, or paint.

Another embodiment of the present invention involves a method for prevention of metal catalyzed coking in a reforming process producing carbon monoxide and hydrogen, comprising constructing the reformer using alloys comprising a metal selected from the group consisting of nickel and cobalt, said alloy also comprising aluminum or being coated, cladded, plated or painted with a material comprising aluminum, and; feeding a hydrocarbon to said reforming process comprising at least 0.5% $CO_2$ by volume and a steam to carbon mole ratio of at least 0.3.

The present invention also describes a process for forming hydrogen for use in a fuel cell comprising: passing a feed comprising hydrocarbons, and $CO_2$, in combination with steam in a reforming process in the presence of a nickel or cobalt containing alloy, at reforming conditions sufficient to form carbon monoxide and hydrogen, wherein said alloy further comprises aluminum or an aluminum diffusion layer and said $CO_2$ content in the feed is sufficient to suppress metal catalyzed coking.

A particularly preferred embodiment of the present invention describes a process for forming hydrogen for use in a fuel cell, comprising: passing a feed comprising hydrocarbons, and $CO_2$, in combination with steam in a reforming process in the presence of a nickel and/or cobalt containing alloy, at reforming conditions sufficient to form carbon monoxide and hydrogen, wherein said alloy further comprises aluminum or an aluminum diffusion layer and said $CO_2$ content in the feed is sufficient to suppress metal catalyzed coking.

In an alternative embodiment of the present invention describes a process for forming hydrogen and carbon monoxide for use in a Fischer-Tropsch plant, comprising: passing a feed comprising hydrocarbons, and $CO_2$, in combination with steam in a reforming process in the presence of a nickel or cobalt containing alloy, at reforming conditions sufficient to form carbon monoxide and hydrogen, wherein said alloy further comprises aluminum or an aluminum diffusion layer and said $CO_2$ content in the feed is sufficient to suppress metal catalyzed coking.

Among other factors I have surprisingly discovered that metal catalyzed coking can be suppressed if not completely eliminated by the use of a nickel and/or cobalt containing alloy that has been aluminum coated or contains aluminum when a controlled amount of carbon dioxide and steam are present in the process stream.

I have discovered that metal catalyzed coking is dramatically reduced or eliminated on aluminum coated or aluminum containing nickel and/or cobalt containing alloys if carbon dioxide and steam is present in the process stream. This is actually quite surprising since carbon dioxide is known to react with hydrocarbons over nickel containing catalysts to form carbon monoxide and hydrogen in a process known as dry reforming. Coking is a serious problem in dry reforming. Thus, I was quite surprised to discover that low levels of carbon dioxide greater than about 0.5 vol % in the process stream, additionally containing steam, will actually suppress coking on Ni and/or cobalt containing alloys containing at least 8 wt % Ni and/or Co and additionally containing aluminum either present in the alloy in the range from about 1 to 10 wt % or as an aluminum surface diffusion coating. The level of carbon dioxide that is needed to prevent coking is directly dependent upon the level of Ni and or Co in the alloy and indirectly proportional to the concentration of Al in the alloy. Thus a high nickel and/or cobalt containing alloy will need a higher concentration of carbon dioxide in the process stream to prevent metal catalyzed coking if the concentration of aluminum in the alloy or the surface diffusion layer is low. Alternatively, a high concentration of aluminum on the outer surface of the alloy will require less carbon dioxide in the process stream to prevent or reduce metal catalyzed coking. Additionally, steam also needs to be present in the process with a steam to carbon ratio greater than about 0.3 in order for carbon dioxide and aluminum in the alloy or as a surface diffusion coating to be effective in suppressing metal catalyzed coking.

Furthermore, I have discovered that it is important that if low Ni and cobalt alloys are used in this art that the concentration of carbon dioxide in the process stream must be in the high range in order to prevent metal catalyzed coking. I have also found that high nickel or cobalt alloys coated with or containing aluminum exhibit better long term durability in reforming applications containing carbon dioxide than does low nickel alloys. Thus high nickel and cobalt alloys are preferred in this art. The sum of nickel plus cobalt should preferably be greater than 8 wt %, more preferably greater than 10 wt %, more preferably greater than 14%, and even more preferably greater than 40%.

DETAILED DESCRIPTION OF THE INVENTION

The process of the present invention can be particularly effective in reducing metal catalyzed coking in any high temperature process in excess of about 800° F. that utilizes, converts, or produces, carbonaceous, or organic containing compounds. An organic containing compound is any compound that contains the elements carbon and hydrogen, but may also include heteroatoms such as nitrogen, and oxygen. Thus organic containing compounds include but are not limited to all hydrocarbons, alcohols, aldehydes, ketones, carboxylic acids, and amines. Carbonaceous compounds are those compounds that contain carbon including all organic compounds as well as carbon monoxide and carbon dioxide.

The process of the present invention is particularly useful in high temperature hydrocarbon conversion processes. Hydrocarbon conversion processes are processes that use, alter, or produce hydrocarbon compounds even in minute amounts. This includes but is not limited to all refinery and petrochemical processes such as hydrocracking, hydrofinishing, isomerization, reforming, fluid catalytic cracking, ethylene steam cracking, dehydrogenation, dehydrogenation over ion conducting membranes, catalytic dehydroalkylation, thermal dehydroalkylation, MTG (methanol to gasoline), MTO (methanol to olefins), etc. Other process that use hydrocarbons where this process of metal catalyzed coke suppression is useful includes, but is not limited to: steam reforming, partial oxidative reforming and autothermal reforming of methane and higher hydrocarbons to hydrogen and CO and/or $CO_2$. The method of the present invention is also useful in reducing metal catalyzed coking in processes that utilize, convert, or produce CO and/or $CO_2$. Thus this process is useful in maintaining activity of catalysts used in the partial oxidation or autothermal reforming of methanol, ethanol, gasoline, diesel, or other hydrocarbon based fuel into hydrogen and carbon monoxide. This technology may also be useful in reducing coking on metal containing catalysts and on the process equipment in autothermal reformers and ion transport membrane partial oxidative reformers for the conversion of natural gas and other hydrocarbons into carbon monoxide and hydrogen. Autothermal reforming is a combination of partial oxidation and steam reforming where the exothermic heat of the partial oxidation supplies the necessary heat for the endothermic steam reforming reaction. Synthesis gas production and autothermal reforming are discussed in U.S. Pat. Nos. 6,085,512, 5,932,141, 4,830,834, 5,486,313, 6,083,425, 6,123,913, and 5,149,464, as well as PCT Publications WO 99/29249 A1, and WO 99/48805 A1, all of which are incorporated by reference herein in their entirety.

Ni and/or cobalt containing alloys that are useful in construction of the plant or process of the present invention include but are not limited to all alloys containing at least about 8 wt % Ni and/or Co including 300 series austenitic stainless steels (i.e. 304, 310, 316, 321, 347), Incoloy 800, Incoloy 802, heat resistant casting such as HK-40, HP-50, Manaurite XTM, and nickel base alloys such as Inconel 600, 601, 617, 625, Hastelloy C and X, Haynes 214, Nimonic 115, and Udimet 700. To be effective in preventing coking, the alloy either needs to be comprised of at least 1% Al and more preferably at least 4% Al up to a maximum of about 10 wt % Al. Or the alloy needs to be coated with a diffusion layer of Al, where Al metal is reacted with the alloy in a high temperature process to form a surface diffusion layer rich in aluminum. The concentration of Al in the surface diffusion layer can range anywhere from 5 to roughly 30 wt % depending upon the preparation method. Furthermore it is advantageous in processes that undergo frequent thermal cycling that the thickness of the aluminum rich diffusion layer be limited to less than about 25 microns and more preferably less than 10 microns. Alloys that contain Al that are useful in this art include but are not limited to, Haynes 214, Udimet 700, and Nimonic 115. Alloys that must be aluminum diffusion coated prior to use include: 316 stainless steel, Incoloy 800, Inconel 600, Inconel 625, Hastelloy C, Hastelloy X, Manaurite XTM, and any other Ni/Co containing alloy containing less than about 1 wt % Al.

Processes where this art is useful include any high temperature hydrocarbon or carbon monoxide containing processes where the presence of carbon dioxide is not detrimental to the process. This includes but is not limited to ethylene steam cracking, reforming of alkanes and naphthenic compounds to aromatics, aromatic reforming reactions, and all process involving the reforming of hydrocarbons and alcohols to carbon monoxide and hydrogen. This art is particularly useful in the steam reforming, partial oxidative reforming and/or autothermal reforming of hydrocarbons and alcohols to carbon monoxide and hydrogen for use in Fischer-Tropisch plants, syngas to methanol plants, fuel cells (both PEM as well as solid oxide fuel cell) or any other process that require or consume hydrogen and/or carbon monoxide.

In some of these processes such as autothermal reforming, where hydrocarbons react with an oxygen containing gas in the presence of steam and a catalyst, carbon dioxide naturally forms as a bi-product of the process. Thus carbon dioxide need not be added to prevent coking of the process metallurgy downstream of the catalyst bed. However coking can be a problem upstream of the catalyst bed. Thus a system can be devised whereby carbon dioxide is circulated from the product stream back to the feed stream to provide the desired level of carbon dioxide to prevent coking in feed side of the process.

Alternatively, carbon dioxide may occur naturally in the feed. The concentration of carbon dioxide can vary quite dramatically in natural gas from the field, and in fact natural gas is often scrubbed of hydrogen sulfide and carbon dioxide before it is sold. Thus the level of carbon dioxide in natural gas can vary from 0 to as high as 50 volume %. Clearly it is desirable to blend high $CO_2$ containing natural gas with a low $CO_2$ source to create a natural gas feed with an ideal level of carbon dioxide. Thereby creating a "low coking" natural gas for use in steam reformers, autothermal reformers, etc.

Additionally, carbon dioxide can be blended with propane or LPG to produce a "low coking" propane or LPG product. Such "low coking" fuels may be very useful in small steam or autothermal reformers supplying hydrogen for fuel cell power generation. Currently, natural gas and light hydrocarbons are first desulfurized and then mixed with steam and pre-reformed over a Ni catalyst to reduce the concentration of coke producing heavy molecules. This step of pre-reforming is preformed only over a narrow temperature range of about 940 to 1000° F. to avoid metal catalyzed coking. In small scale reformers it will be very difficult or expensive to tightly control temperature in a pre-reformer catalyst bed, hence it is more desirable and more cost effective to simply sell a "low coke" producing fuel. Thereby eliminating the need for pre-reforming.

For the method of the present invention to be effective the process stream must contain carbon dioxide in a quantity that suppresses metal catalyzed coking. Particularly effective concentrations of carbon dioxide are typically above 0.5 volume %, preferably above 1% and more preferably above 2 vol %. Steam must also be present in the process stream for this art to be effective. Preferably, the steam to carbon ratio should be in excess of 0.3 and preferably in excess of 0.5. In some instances the steam to carbon ratio should be in excess of 1.0, preferably in excess of 1.5.

By metal catalyzed coking, I mean the metal catalyzed reaction of organic compounds, and in particular hydrocarbons to form coke or carbonaceous deposits at temperatures as low as about 800° F. These metals may reside on or in the catalyst, come from the process equipment, or exist in the feed itself such as Ni in residuum. Metals that can cause or catalyze a coking reaction include but are not limited to Mn, Fe, Ru, Os, Co, Rh, Ir, Ni, Pd, Pt, Cu, and their associated carbides. In particular metal catalyzed coking refers to coke formed as a result of a reaction with metal surfaces, typically containing Fe, Co, and/or Ni, and not coke formed as a result of other high temperature gas phase processes. Metal catalyzed coking can be easily distinguished from other forms of coking by measuring the amount of coke that builds up on a test metal coupon versus a clean surface such as clean quartz glass under the appropriate process conditions.

The meaning of "aluminum in association with the alloy" used in the present application is meant to include coatings of aluminum, such as by painting, cladding, etc., or as including aluminum as part of the alloy. Preferably the aluminum coating will form an aluminum diffusion layer associated with the alloy as discussed below.

The method of the present invention can significantly reduce the degree of metal catalyzed coking. The phrase "significantly reduce the degree of metal catalyzed coking" is meant to include a visible or measurable reduction in the degree of metal catalyzed coking.

In the present application the term coke is referring to a carbon-rich carbonaceous material, generally with a C/H ratio>1. The term coke as used herein is meant to include the conventional meaning known in the art.

The technology of the present invention can also be used to reduce coking in furnace tubes and heat exchangers involved in the processing of organic containing compounds at temperatures above 800° F.

Aluminum coatings can be useable in the present invention. Although not to be limited by theory, it is thought that to be effective the aluminum coating should form an aluminum diffusion layer. Aluminum coated materials can be used in at least a portion of the metal surfaces in the reactor system, particularly those portions of the reactor system that are heated to a temperature of above about 800 degrees F. Such metal surfaces include but are not limited to, the reactor walls, furnace tubes, heat exchangers and the like. Suitable methods for applying aluminum to metal surfaces include well known deposition techniques. Preferred processes include powder and vapor diffusion processes such as the "Alonizing" process, which has been commercialized by Alon Processing, Inc., Terrytown, Pa. Essentially, "Alonizing" is a high temperature diffusion process which alloys aluminum into the surface of a treated metal, such as, e.g., a commercial grade mild steel. In this process, the metal (e.g., a mild steel) is positioned in a retort and surrounded with a mixture of blended aluminum powders. The retort is then hermetically sealed and placed in an atmosphere-controlled furnace. At elevated temperatures, the aluminum deeply diffuses into the treated metal resulting in an alloy. After furnace cooling, the substrate is taken out of the retort and excess powder is removed.

As mentioned above the present invention can be particularly useful in reforming hydrocarbons to form hydrogen and carbon monoxide suitable for use in a Fischer-Tropsch plant. Catalysts and conditions for performing Fischer-Tropsch synthesis are well known to those of skill in the art, and are described, for example, in EP 0 921 184 A1, the contents of which are hereby incorporated by reference in their entirety. (See also WO 01/02325).

A particularly preferred embodiment of the present invention is the use of metal catalyzed coke suppression in an on-board reformer for a fuel cell, such as in a fuel cell powered motor vehicle. In this embodiment of the present invention an on-board reformer would be used to convert a carbonaceous material such as a hydrocarbon mixture, ethanol, or methanol at high temperature to form a stream comprising hydrogen. The hydrogen produced by the on-board reformer would then be used by the fuel cell to create energy to power the vehicle. The present invention can be utilized to prevent metal catalyzed coking on the high temperature metal parts of the on-board reformer, such as the vessel containing the autothermal reformer catalyst and the subsequent heat exchanger. Examples of Fuel cell/Reformer systems that may be used in the process of the present invention are described in U.S. Pat. Nos. 5,527,632, 4,659,634, 4,365,006, 6,077,620, and 5,346,779 which are herein incorporated by reference.

EXAMPLES

The present examples are intended to help illustrate the process of the present invention and are not meant to limit the scope of the application.

Example 1

A series of metal alloys containing Al either as part of the alloy or as a surface diffusion coating were placed in a quartz boat in a quartz tube and then exposed to a gas mixture containing 7 vol % ethane, 1 vol % propane, 2 vol % carbon dioxide and balance methane. The furnace was heated to 1400° F. and steam was introduced into the gas stream so that the steam to carbon ratio of the process gas was 2.5. The samples were then held at 1400° F. for 48 hours. The samples were then examined using an optical microscope to gauge the level of coking. The results for the different alloys are presented in Table 1.

Example 2

The same series of alloys as in Example 1 along with some additional alloys were run again in the same apparatus and under identical conditions, except this time the natural gas stream was first bubbled through a 5 wt % NaOH solution to reduce the concentration of $CO_2$ to less than 0.01 vol %. The results of the various alloys are presented in Table 1.

Example 3

Aluminum coated 316 stainless steel and a coupon of "plain" 316 stainless were run again in the same apparatus and under identical conditions except this time the natural gas stream was first blended with $CO_2$ to produce a gas mixture containing 6 volume % ethane, 1 volume % propane, 19 volume % $CO_2$ and the balance methane. The results are presented in Table 1.

TABLE 1

Effect of $CO_2$ on the Metal Catalyzed Coking of Various Aluminum Containing Alloys Run Under a Natural Gas Mixture for 48 hours at 1400° F.

| Alloy | Sum of Ni + Co Wt % | $CO_2$, vol % | Steam/Carbon Ratio | Al content | Coke after 48 Hours |
|---|---|---|---|---|---|
| Inconel 600 | 72 | 2.0 | 2.5 | diffusion coated | none |
| Inconel 600 | 72 | 0.0 | 2.5 | diffusion coated | heavy, ~15 microns thick |
| Haynes 214 | 75 | 2.0 | 2.5 | 4.3% | minor, only on the edges |
| Haynes 214 | 75 | 0.0 | 2.5 | 4.3% | heavy, ~30 microns thick |
| Undimet 700 | 72 | 2.0 | 2.5 | 4.1% | minor, spotty islands of coke |
| Undimet 700 | 72 | 0.0 | 2.5 | 4.1% | heavy, ~15 microns thick |
| Inconel 601 | 61 | 2.0 | 2.5 | 1.4% | moderate, heavily spotted |
| Inconel 601 | 61 | 0.0 | 2.5 | 1.4% | moderate, uniform coke |
| Inconel 617 | 67 | 2.0 | 2.5 | 1.0% | heavy, ~30 microns |
| Inconel 617 | 67 | 0.0 | 2.5 | 1.0% | moderate, ~10 micron thick |
| Incoloy 800 | 32 | 0.0 | 2.5 | diffusion coated | moderate, spotty |
| Incoloy 800 | 32 | 0.0 | 2.5 | none | heavy |
| Fecralloy | 0 | 0.0 | 2.5 | 5.0% | none |
| Inconel 600 | 72 | 2.0 | 0.5 | none | heavy, ~90 microns |
| Incoloy 800 | 32 | 2.0 | 0.5 | diffusion coated | minor, spotty islands of coke |
| Incoloy 800 | 32 | 2.0 | 0.5 | none | heavy, ~30 microns |
| Fecralloy | 0 | 2.0 | 0.5 | 5.0% | minor, spotty islands of coke |
| Fecralloy | 0 | 2.0 | 0 | 5.0 | moderate, ~15 microns thick |
| Inconel 600 | 72 | 2.0 | 0 | diffusion coated | heavy, ~75 microns |
| Haynes 214 | 75 | 2.0 | 0 | 4.3% | heavy, 30 to 100 microns thick |
| Inconel 601 | 61 | 2.0 | 0 | 1.4% | heavy, 50 to 100 microns thick |
| Fecralloy | 0 | 2.0 | 0 | 5.0% | moderate, 15 microns thick |
| 316 Stainless Steel | 12 | 2.0 | 2.5 | none | moderate coking, ~20 microns |
| 316 Stainless | 12 | 2.0 | 2.5 | diffusion coated | heavily spotted, |

TABLE 1-continued

Effect of CO₂ on the Metal Catalyzed Coking of Various Aluminum Containing Alloys Run Under a Natural Gas Mixture for 48 hours at 1400° F.

| Alloy | Sum of Ni + Co Wt % | $CO_2$, vol % | Steam/Carbon Ratio | Al content | Coke after 48 Hours |
|---|---|---|---|---|---|
| Steel | | | | | ~30 micron islands |
| 316 Stainless Steel | 12 | 19.0 | 2.5 | none | moderate coking, ~10 microns |
| 316 Stainless Steel | 12 | 19.0 | 2.5 | diffusion coated | minor, spotty islands of coke |

Table 1 clearly shows the benefits of having 2 volume % carbon dioxide in the process stream of a natural gas mixture in the coking of aluminum diffusion coated or Al containing alloys with an aluminum content greater than 1.4% (i.e. Inconel 601) and more preferably greater than 4% (compare effect of coke on Haynes 214 and Undimet 700 with and without $CO_2$). As the Ni and/or Co content of the alloy decreases the effectiveness of adding carbon dioxide falls off. Thus Fecralloy, which contains no Ni or Co, shows no metal catalyzed coking even in the $CO_2$ free process stream. Steam is a necessary element to prevent coking. With no steam all the samples are coked, in spite of the 2.0% carbon dioxide in the process steam. With a steam to carbon ratio of 0.5, the Al coated Incoloy 800 shows only a minor amount of coking, whereas the bare metallurgy is heavily coked. This shows that the steam to carbon ratio should be at least 0.3 and more preferably greater than 0.5 for this art to be effective. As the Ni plus Co content of the alloy drops the process stream requires more $CO_2$ to prevent coking. Thus the Al coated 316 stainless steel sample is coked when the process stream only contained 2.0 vol % $CO_2$, but is practically coke free when the concentration of $CO_2$ is 19%.

What is claimed is:

1. A method for prevention of metal catalyzed coking of an alloy containing at least one of nickel or cobalt in a reforming process for the production of carbon monoxide and hydrogen, at reforming conditions, by the addition of aluminum to said alloy or by the addition of an aluminum diffusion layer, and by selection of a feed to said reforming process comprising at least 0.5% $CO_2$ by volume and a steam to carbon ratio of at least 0.3.

2. The method of claim 1 wherein said alloy is coated, cladded, plated or painted with a material comprising aluminum.

3. The method of claim 1 wherein said reforming conditions comprise a temperature of at least 800 degrees F. and wherein said feed contains at least 50 volume percent hydrocarbons on a dry basis.

4. The method of claim 1 wherein $CO_2$ is added to the feed.

5. The method of claim 1 wherein at least a portion of the hydrogen is passed to a fuel cell.

6. The method of claim 1 wherein at least a portion of the hydrogen and carbon monoxide is passed to a Fischer-Tropsch plant.

7. The process of claim 1 wherein the reforming conditions comprise a steam to carbon ratio of at least 0.5.

8. The process of claim 1 wherein the reforming conditions comprise a steam to carbon ratio of at least 1.0.

9. The process of claim 1 wherein the reforming conditions comprise a steam to carbon ratio of at least 1.5.

10. The process of claim 1 wherein the reforming conditions comprise a temperature of at least 900 degrees F.

11. The process of claim 1 wherein the alloy comprises at least 10 wt % nickel or cobalt or a combination thereof.

12. The process of claim 1 wherein the alloy contains at least 1 wt % aluminum.

13. The process of claim 1 wherein the alloy contains an aluminum diffusion layer.

14. The method claim 1 wherein the alloy is aluminum-plated by electroplating.

15. The method of claim 1 wherein the reforming process is an autothermal reforming process.

16. An improved process for the prevention of metal catalyzed coking in a steam reforming process for the production of carbon monoxide and hydrogen from a hydrocarbon feedstock wherein the reforming process is conducted in the presence of an alloy which is rich in a metal selected from the group consisting of nickel and cobalt, wherein the improvement comprises including an effective amount of aluminum in association with the alloy and including in the hydrocarbon feedstock an amount of carbon dioxide sufficient to significantly reduce the degree of metal catalyzed coking.

17. The process of claim 16 wherein the ratio of steam to carbon ratio in the feed to the reforming process is at least 0.3.

18. The process of claim 16 wherein the reforming process comprises a temperature of at least 800 degrees F. and wherein said hydrocarbon feedstock has a hydrocarbon content of at least 50 volume % on a dry basis.

19. The method of claim 1 wherein the feed comprises propane.

20. The process of claim 1 wherein the alloy contains an aluminum diffusion layer.

* * * * *